United States Patent
Okada et al.

(10) Patent No.: US 7,133,733 B2
(45) Date of Patent: Nov. 7, 2006

(54) DESIGN SUPPORT SYSTEM

(75) Inventors: Toru Okada, Kawasaki (JP); Masanao Fujii, Kawasaki (JP); Takatoyo Yamakami, Kawasaki (JP); Kazuhisa Mishima, Kawasaki (JP); Toshiaki Otsuka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 10/806,105

(22) Filed: Mar. 23, 2004

(65) Prior Publication Data

US 2005/0038537 A1    Feb. 17, 2005

(30) Foreign Application Priority Data

Aug. 14, 2003  (JP)  ............................. 2003-293385

(51) Int. Cl.
*G06F 19/00*    (2006.01)

(52) U.S. Cl. ........................................................ 700/97

(58) Field of Classification Search ................ 700/97; 703/1
See application file for complete search history.

(56) References Cited

U.S. PATENT DOCUMENTS

| | | | |
|---|---|---|---|
| 5,777,876 A | * | 7/1998 | Beauchesne ................ 700/95 |
| 6,775,647 B1 | * | 8/2004 | Evans et al. ................... 703/7 |
| 2004/0064211 A1 | * | 4/2004 | Mateau et al. ................ 700/97 |
| 2004/0158340 A1 | * | 8/2004 | Fischer et al. ................ 700/97 |

FOREIGN PATENT DOCUMENTS

| | | |
|---|---|---|
| JP | 2002-373018 | 12/2002 |
| JP | 2003-108910 | 4/2003 |

* cited by examiner

*Primary Examiner*—Leo Picard
*Assistant Examiner*—Ryan Jarrett
(74) *Attorney, Agent, or Firm*—Staas & Halsey LLP

(57) ABSTRACT

The present invention relates to a design support system constructed so as to comprise a manufacturing line information preparation section and an output section. On the basis of element types selected by a selection section as arbitrary element types to be used for constituting a manufacturing line, the manufacturing line information preparation section prepares information about the manufacturing line by means of acquiring information about element types stored in an element type database beforehand. The output section can output the information about the manufacturing line prepared by the manufacturing line information preparation section. A manufacturing line including a plurality of steps is efficiently examined, determined, and established, thereby shortening the time required to design and manufacture the manufacturing line and curtailing manufacturing costs.

28 Claims, 11 Drawing Sheets

REGISTER DESIGNATION AND GROUP OF MANUFACTURING LINE

REGISTER TYPES AND PROCESS SEQUENCES OF PIECES OF EQUIPMENT

| ID | EQUIPMENT | LINE/GROUP | GROUP | TYPE | ORDER |
|---|---|---|---|---|---|
| 29 | UNLOADER | CONSISTENT | PMA | SUPPLIER | 14 |
| 31 | DISPENSER | ELEMENT STACK | GYRO | DISPENSER | 1 |
| 32 | PLACER | ELEMENT STACK | GYRO | PLACER | 2 |
| 33 | CURER | ELEMENT STACK | GYRO | CURER | 3 |
| 34 | Ag PASTE | ELEMENT STACK | GYRO | DISPENSER | 4 |
| 35 | FPC PLACER | ELEMENT STACK | GYRO | PLACER | 5 |
| 36 | BONDER | ELEMENT STACK | GYRO | CURER | 6 |
| 37 | LOADER | OPT | OPT | SUPPLIER | 1 |
| 38 | TRANSFER CELL | OPT | OPT | DISPENSER | 2 |
| 39 | PLACE CELL | OPT | OPT | PLACER | 3 |
| 40 | UV EXPOSURE CELL | OPT | OPT | CURER | 4 |
| 41 | INSPECTION CELL | OPT | OPT | DISPENSER | 5 |
| 42 | UNLOADER | OPT | OPT | SUPPLIER | 6 |
| | | | | | 0 |

REGISTER DESIGNATIONS OF RESPECTIVE PIECES OF EQUIPMENT

DESIGN SUPPORT SYSTEM

BACKGROUND OF THE INVENTION (1) Field of the Invention

The present invention relates to a design support system, design support method and computer-readable recording medium in which design support program is recorded suitable for use in supporting the design of a manufacturing line constituted by combination of a plurality of element types; for example, a manufacturing line to be used for manufacturing an electronic device or the like.

(2) Description of the Related Art

For instance, a manufacturing line (e.g., a manufacturing process) to be used for manufacturing an electronic device, such as a sensor device, is formed by combination of a variety of placing processes (pieces of manufacturing equipment), such as a dispensing process, a placing process, and a curing process. A manufacturing system is established by means of developing a manufacturing line (e.g., an electronic device manufacturing line) customized to an individual electronic device.

In the design and development of the manufacturing line, human-labor savings, high implementation accuracy, and space savings by means of automation are required in the form of specifications. In association with shortening of a cycle of development of a product, early commencement of a manufacturing line is requested.

In accordance with the structure, form, and material property of a product to be produced (e.g., an electronic device), a line for manufacturing the electronic device varies in terms of required implementation accuracy, a curing method, a material, a process, and requirements (e.g., required accuracy of assembly).

In a conventional technique for designing and developing a manufacturing line, a client or a person who examines specifications of a line confers with a line designer, thereby determining the implementation accuracy and specifications required for manufacturing a manufacturing line, such as the curing method, the material, the process, and the requirements. After the mechanism incorporating these specifications has been designed (manufacturing equipment has been designed), required mechanism elements, a power mechanism, electronic components, or the like are purchased. Alternatively, required unique mechanism elements are newly manufactured by means of machining or the like. Thus, various pieces of equipment required for constituting the manufacturing line (manufacturing process) are assembled.

When a group of pieces of equipment are arranged as a line, a transferring apparatus is interposed among the pieces of equipment, thereby interconnecting the equipment. When individual pieces of equipment are arranged independently as single units, a loader and an unloader are disposed for accepting and delivering workpieces.

A delivery time for introducing the tooling usually requires, e.g., six months or thereabouts. In order to verify the performance required by processes, performance evaluation is performed on a per-equipment basis. In particular, new custom-designed equipment has not yet been proven and, therefore, requires meticulous performance evaluation before shipment.

In connection with the conventional technique for designing and developing a manufacturing line, a period required for developing a manufacturing line can be subdivided into three periods; namely, (1) a period for examining specifications of a line (equipment); (2) a period for designing the mechanism of the line (equipment); and (3) a period for assembling, debugging, and verifying newly-designed equipment. In order to commence the manufacturing line early, an attempt must be made to shorten these periods (1) through (3).

For instance, in relation to (1) examination of specifications of a line, a supplier hitherto replies to inquiries made by a purchaser at the time of determination of specifications during the course of examination, development, and design of a manufacturing line, while consulting with the purchaser or after having examined the inquiries. Japanese Patent Application Laid-open NO. 2003-108910 (Patent Document 1 provided below) discloses a system which supports processes for determining specifications and installation requirements of a semiconductor manufacturing apparatus by utilization of communications means between a purchaser of the semiconductor manufacturing apparatus and a supplier of the same, in order to shorten a period of time which lapses before specifications of the manufacturing apparatus to be installed in a semiconductor factory are determined [corresponding to (1) Examination of specifications of a line], with a view toward commencing operation of the semiconductor factory as early as possible.

[Patent Document 1] Japanese Patent Application Laid-open NO. 2003-108910

However, the system described in Patent Document 1 is intended for supporting processes for determining specifications or installation requirements of the semiconductor manufacturing apparatus between the user of the semiconductor manufacturing apparatus and the supplier of the same. This system is effective for shortening the period (1) for examining specifications of the line. However, even when a designer has employed this system in a design phase, a design time cannot be shortened, nor can a design cost be curtailed.

In relation to the design of a manufacturing line, a general demand also exists for curtailing costs required for design, as well as shortening the period (2) for designing the mechanism of the line (equipment) and the period (3) for assembling, debugging, and verifying the newly-designed equipment.

SUMMARY OF THE INVENTION

The present invention has been conceived in light of such a problem and aims at shortening a time required for designing and manufacturing a manufacturing line and curtailing manufacturing costs by means of efficiently examining, determining, and establishing a manufacturing line comprising a plurality of processes.

To this end, a design support system of the present invention corresponds to a design support system for supporting design of a manufacturing line constituted by combination of a plurality of element types, the system comprising: an element type database for storing information about the element types beforehand; an indication section which indicates to an operator in a selectable manner the element types stored in the element type database; a selection section capable of selecting arbitrary element types to be used for constituting the manufacturing line from among the element types indicated by the indication section; a manufacturing line information preparation section for preparing information about the manufacturing line by mans of acquiring information about the element types stored in the element type database on the basis of the element types selected by the selection section; and an output section capable of outputting information about the manufacturing line prepared by the manufacturing line information preparation section.

The design support system may further comprise an element type determination section for determining the element types or specifications of the element types on the basis of the element types selected by the selection section, wherein the manufacturing line information preparation section prepares information about the manufacturing line on the basis of the element types or the specifications of the element types determined by the element type determination section.

Further, the element type database may store determination information in association with element types, and the element type determination section may determine element types or specifications thereof on the basis of the determination information. Further, the element type database may store manufacturing processes (processes and pieces of equipment) required in the manufacturing line and element types related to the manufacturing processes in association with each other. Moreover, the element type database may hierarchically manage the manufacturing processes.

Moreover, the design support system may further comprise a component database which stores information about components constituting the element types, or the component database may perform sorting and extraction of information about the components registered in the component database while taking predetermined conditions as a key.

Further, the design support system may further comprise information about an engineering drawing of the components in association with the components, wherein the output section may output information about an engineering drawing of the components.

The design support system may further comprise information about the appearance of the element types; and an appearance information preparation section for preparing information about the appearance of the manufacturing line on the basis of information about the appearance of the element types, wherein the output section may output information about the appearance of the manufacturing line prepared by the appearance information preparation section.

The design support system may further comprise a manufacturing line information storage section which can store a plurality of pieces of information about the manufacturing line prepared by the manufacturing line information preparation section and which can extract and arrange the plurality of pieces of information about the manufacturing line under arbitrary conditions on the basis of details of the information about the manufacturing line; and a line candidate indication section for indicating the extracted and arranged information about the manufacturing line as a candidate for the manufacturing line.

The design support system may further comprise: a condition input section which enables input of conditions pertaining to preparation of information about the manufacturing line to be prepared by the manufacturing line information preparation section, wherein the manufacturing line information preparation section may selectively use the plurality of element types on the basis of information about the element types stored in the element type database, thereby preparing information about the manufacturing line satisfying the conditions input by the condition input section.

Moreover, the design support system may further comprise a data exchange section capable of exchanging data with an external information processing system, and the external information processing system may be a system for managing manufacturing costs of the manufacturing line; the data exchange section may acquire from the external information processing system information about manufacturing costs of the manufacturing line; and the output section may output the information about the manufacturing line prepared by the manufacturing line information preparation section and the information about manufacturing costs of the manufacturing line acquired by the data exchange section in such a manner that the pieces of information can be compared with each other.

The external information processing system may be a purchasing system, and the data exchange section may transfer, to the purchasing system, the information about the manufacturing line prepared by the manufacturing line information preparation section.

The manufacturing line information preparation section may compute at least the number of components required to constitute the manufacturing line as information about the manufacturing line on the basis of the information about components constituting the element types stored in the component database.

The data exchange section may transfer at least the number of components required to constitute the manufacturing line to the external information processing system.

Information pertaining to the element types stored in the element type database may comprises at least any of a manufacturing unit price, a delivery time, accuracy, a processing time, visual information, and comment, all pertaining to the element types.

Information about the manufacturing line may be information pertaining to performance or a manufacturing cost of the manufacturing line.

The present invention further provides a design support method for supporting design of a manufacturing line constituted by combination of a plurality of element types, the method comprising the steps of: (a) indicating to an operator in a selectable manner the element types stored in an element type database storing information about the element types beforehand; (b) selecting arbitrary element types to be used for constituting the manufacturing line from among the element types indicated in the step (a); (c) preparing information about the manufacturing line by mans of acquiring information about the element types stored in the element type database on the basis of the element types selected in the step (b); and (d) outputting information about the manufacturing line prepared in the step (c).

The present invention still further provides a computer-readable recording medium in which design support program is recorded for supporting design of a manufacturing line constituted by combination of a plurality of element types, the program instructing a computer to perform the steps of: (a) indicating to an operator in a selectable manner the element types stored in an element type database storing information about the element types beforehand; (b) selecting arbitrary element types to be used for constituting the manufacturing line from among the element types indicated in the step (a); (c) preparing information about the manufacturing line by mans of acquiring information about the element types stored in the element type database on the basis of the element types selected in the step (b); and (d) outputting information about the manufacturing line prepared in the step (c).

The design support system, design support method and computer-readable recording medium in which design support program is recorded of the invention yields the following effects or advantages.

(1) Information about the element types previously stored in the element type database is acquired on the basis of the element type selected by the selection section, whereby information about the manufacturing line is prepared. The thus-prepared information about the manufacturing line is output. As a result, an operator can efficiently examine, determine, and establish a manufacturing line including a variety of processes, by means of selecting the element types to be used for constructing the manufacturing line through use of the selection section while ascertaining the element types on the indication section.

(2) The operator can readily ascertain specifications and performance of the manufacturing line, and hence a manufacturing line which has a high degree of convenience and satisfies required specifications and performance can be designed readily and within a short period of time.

(3) There can be avoided occurrence of an impossible combination of constituent elements in view of design or construction of constituent elements by means of a meaningless combination, thereby enhancing reliability of the manufacturing line.

(4) Processes newly developed as element types can be immediately used for another application in the field by a person who examines specifications. Thus, a high degree of convenience is achieved.

(5) When a plurality of operators (e.g., a designer and the specification examiner) are involved, the information about the equipment (element types) prepared by the operator can be shared among the plurality of operators, whereby a high degree of convenience is achieved.

(6) Examination of reduction of costs can be smoothly and readily examined.

(7) A list of components constituting the manufacturing line (i.e., a parts list) can be easily and accurately prepared, or overlapping components can be readily sorted and summated. Hence, when manufacture of the manufacturing line is requested, placement of an order for manufacture can be automated.

(8) Data can be exchanged with respect to an external information processing system, and hence the prepared information about a manufacturing system can be effectively utilized, whereby a high degree of convenience is achieved.

(9) Other element types required for constructing a manufacturing line, specifications of the element types (e.g., an electrical interface, the number of drivers, and the number of air pipes), constituent elements, or the like are automatically determined. Hence, a high degree of convenience is achieved, or occurrence of a design failure or the like is unlikely to arise, thereby enhancing design quality.

(10) Data pertaining to element types can be managed in the same manner as in the case of configuration of an actual manufacturing line, whereby a high degree of convenience is achieved.

(11) On the basis of information about the appearance of the element types, information about the appearance of a manufacturing line is prepared. Information about the appearance of the manufacturing line is output. Hence, the operator can readily ascertain the appearance of the manufacturing line, whereby a high degree of convenience is achieved.

(12) Information about an engineering drawing of element types is stored in association with the element types. Hence, the operator can readily refer to or use the engineering drawing, thus achieving a high degree of convenience. Moreover, examination for curtailing costs for manufacturing components (i.e., cost reduction) can be readily performed.

(13) Components can be sorted or extracted under predetermined conditions. This also enables easy examination for the purpose of reducing the number of individual components and element types and curtailing costs for manufacturing equipment (cells) (cost reduction).

(14) The operator can quickly and readily acquire a manufacturing line satisfying desired requirements.

(15) The operator can quickly and readily acquire a candidate for the manufacturing line satisfying specifications required for a manufacturing line (e.g., a processing speed, accuracy, costs, or the like), whereby a high degree of convenience is achieved.

(16) The required number of components constituting at least a manufacturing line is computed as information about a manufacturing line. Hence, the operator can readily and accurately ascertain the required number of components, whereby a high degree of convenience is achieved.

(17) The operator can readily ascertain information about performance or manufacturing costs of a manufacturing line, whereby a high degree of convenience is achieved.

BRIEF DESCRIPTION OF THE DRAWINGS

FIG. 6 is a view showing an example of the element type database in the design support system according to the embodiment of the present invention;

FIG. 9 is a view showing an example input screen in the design support system according to the embodiment of the present invention;

FIG. 10 is a view showing an example input screen in the design support system according to the embodiment of the present invention; and FIG. 11 is a view showing an example output screen in the design support system according to the embodiment of the present invention.

DETAILED DESCRIPTION OF THE PREFERRED EMBODIMENT

An embodiment of the present invention will be described hereinbelow by reference to the drawings.

Figure 1:
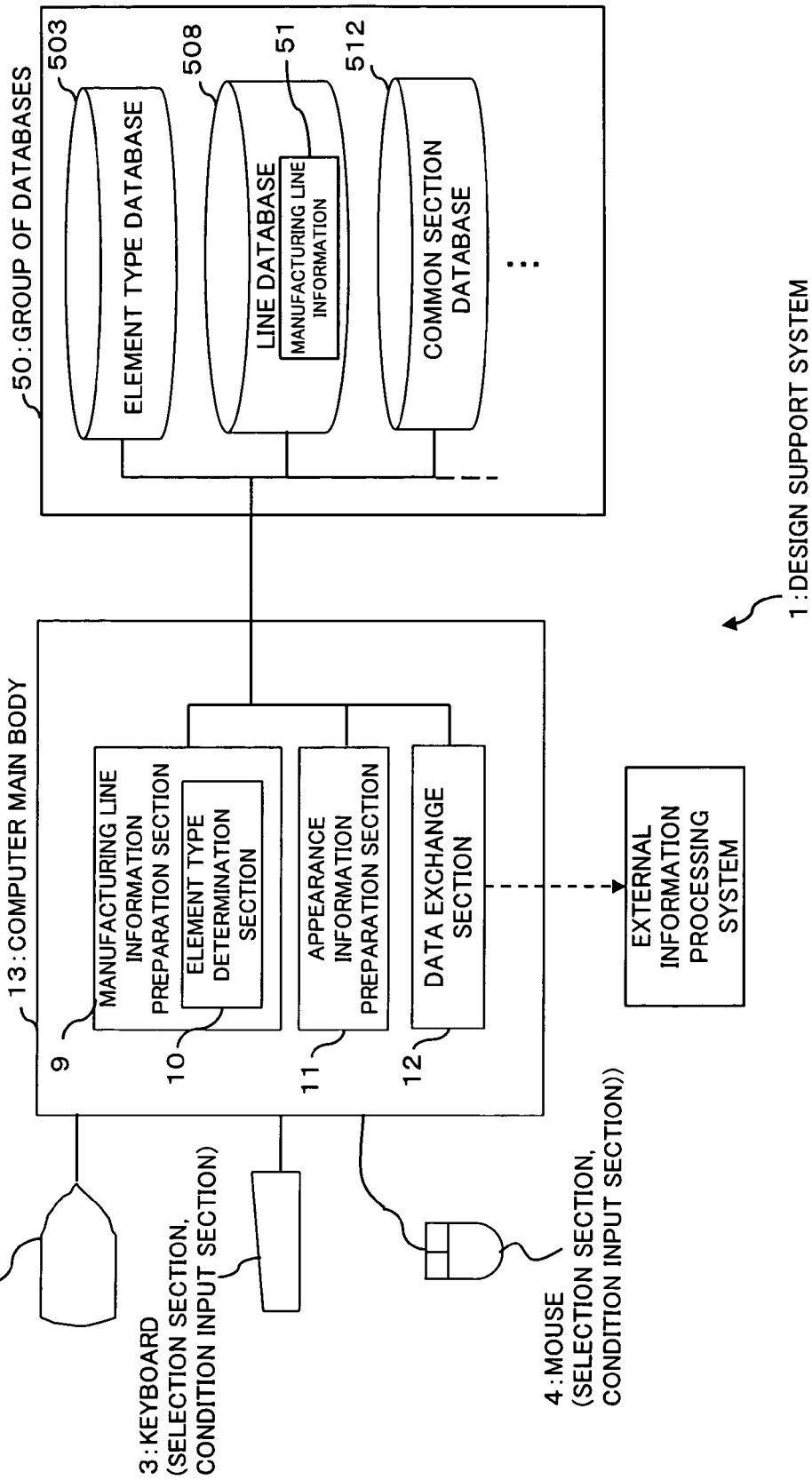
FIG. 1 is a view schematically showing the configuration of a design support system according to an embodiment of the present invention.
Figure 2:
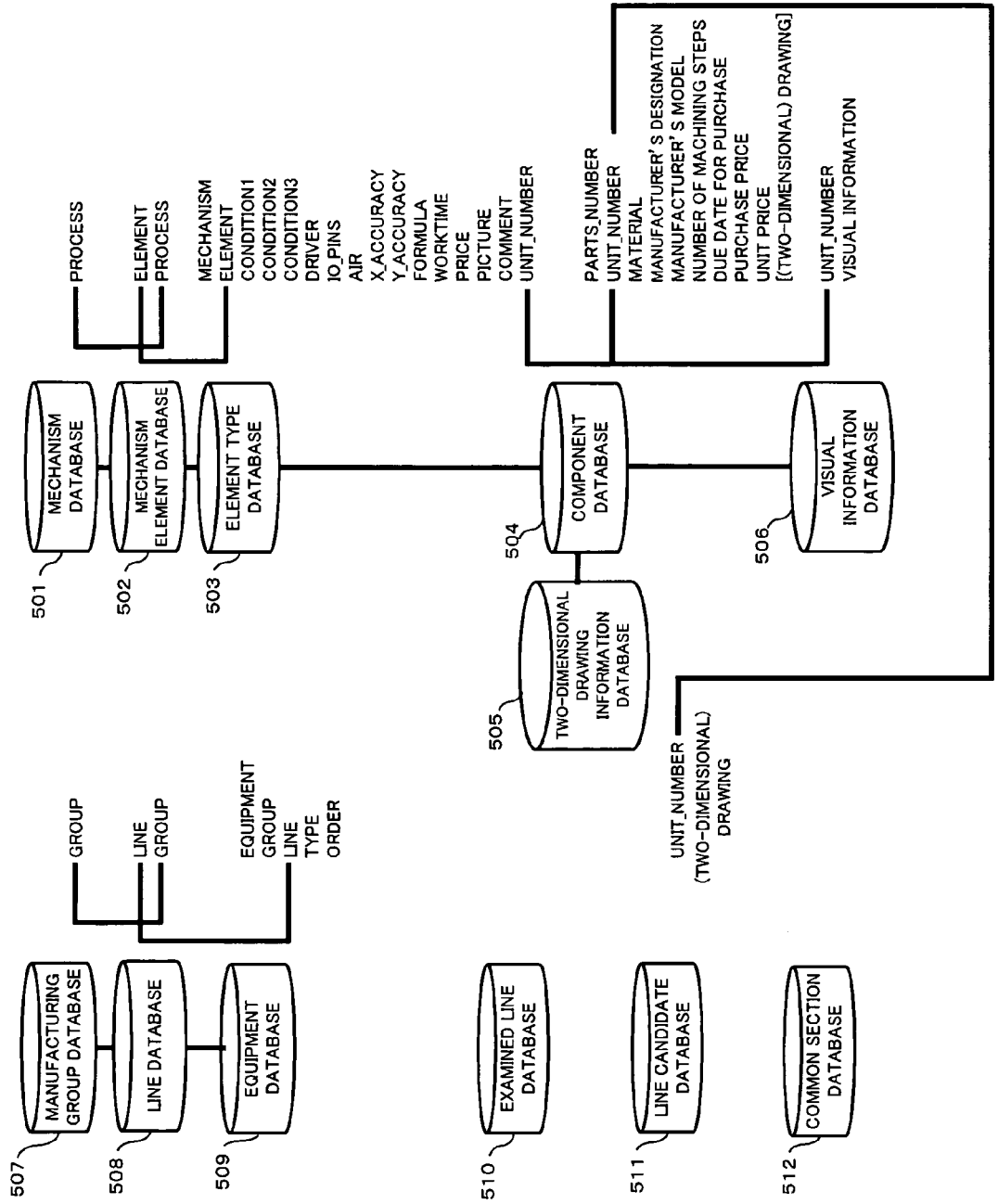
FIG. 2 is a view showing a database included in a group of databases in the design support system according to the embodiment of the present invention and an example configuration of the database.
Figure 3:
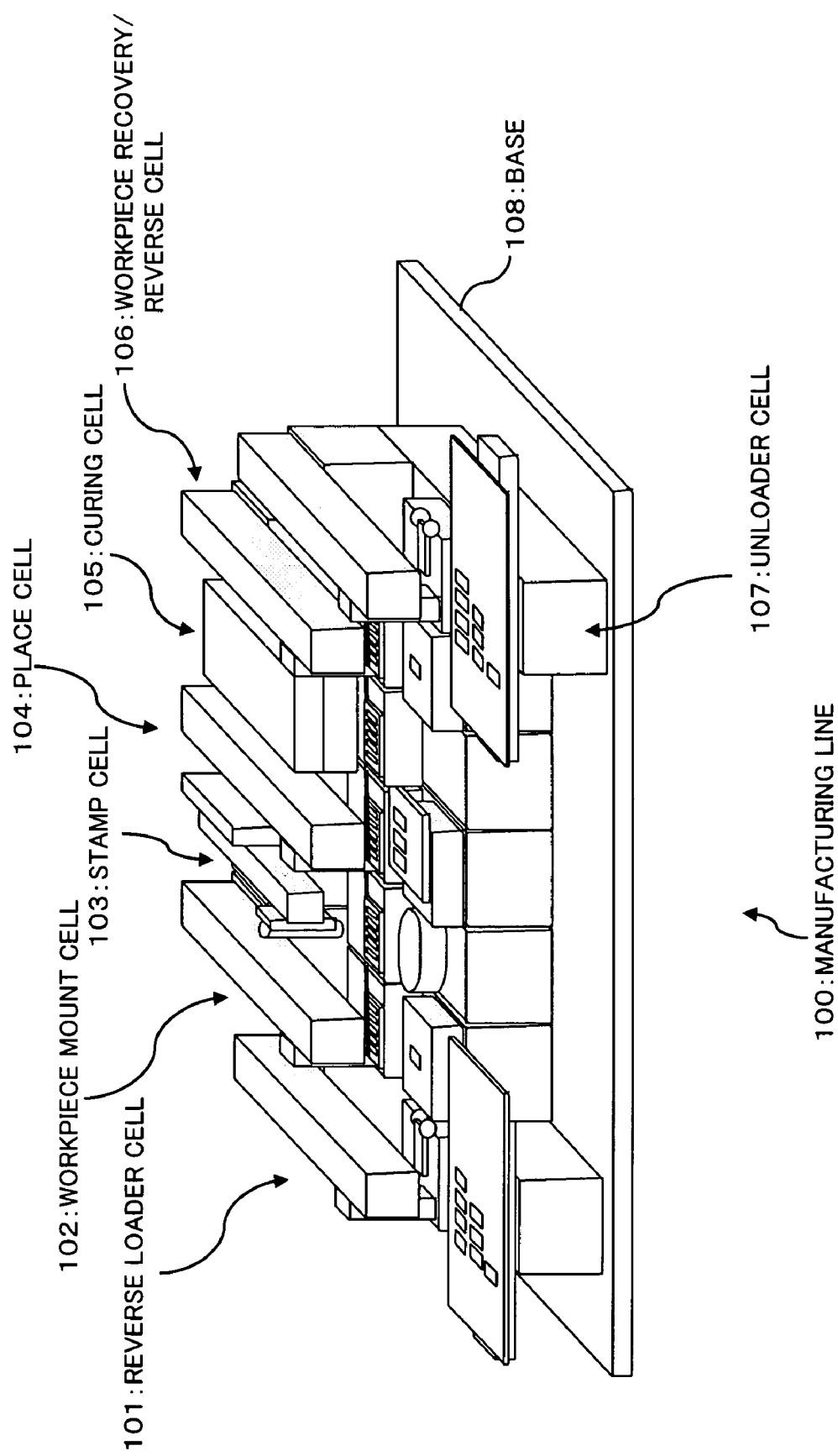
FIG. 3 is a perspective view schematically showing an appearance of a manufacturing line.
Figure 4A:
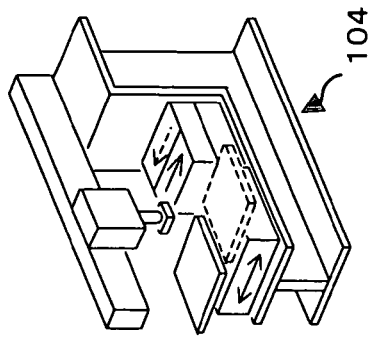
FIGS. 4A to 4G are perspective views showing cells constituting the manufacturing line shown in FIG. 3.
Figure 4B:
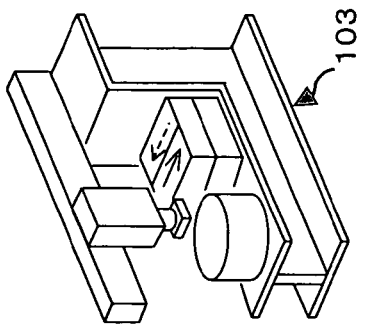
Figure 4C:
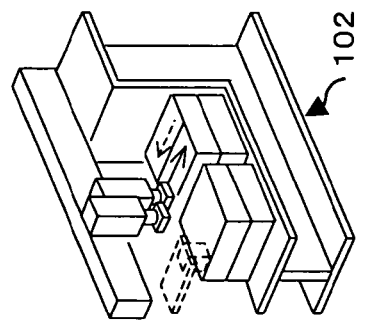
Figure 4D:
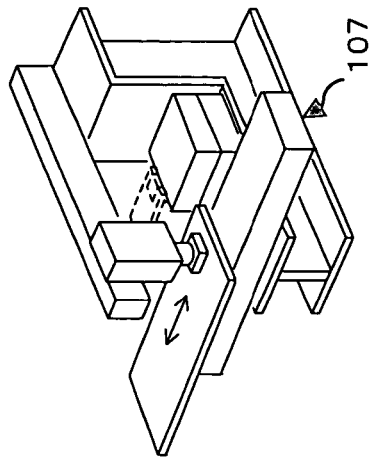
Figure 4E:
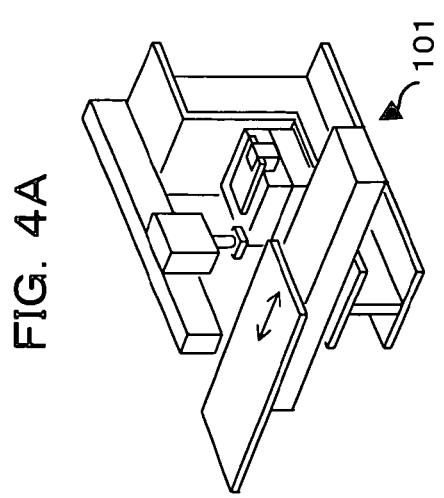
Figure 4F:
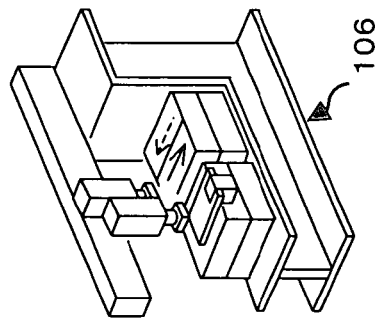
Figure 4G:
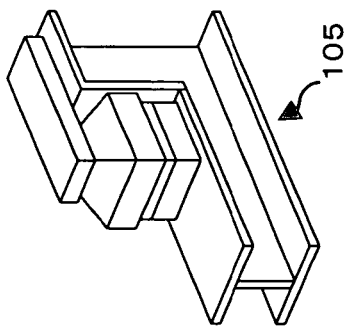

FIG. 1 is a view schematically showing the configuration of a design support system according to an embodiment of the present invention; FIG. 2 is a view showing a database included in a group of databases in the design support system according to the embodiment of the present invention and an example configuration of the database; FIG. 3 is a perspective view schematically showing an appearance of a manufacturing line; and FIGS. 4A to 4G are perspective views showing cells constituting the manufacturing line shown in FIG. 3. FIG. 4A is a perspective view showing a reverse loader cell; FIG. 4B is a perspective view showing a workpiece place cell; FIG. 4C is a perspective view showing a stamp cell; FIG. 4D is a perspective view showing a place cell; FIG. 4E is a perspective view showing a curing cell; FIG. 4F is a perspective view showing a workpiece recovery/reverse cell; and FIG. 4G is a perspective view showing an unloader cell.

The design support system 1 supports a designer who designs and develops a manufacturing line such as that shown in FIG. 3. There will first be described a manufacturing line 100 whose design is supported by the design support system 1.

The manufacturing line 100 shown in FIG. 3 is for manufacturing an electronic device; e.g., a sensor device, and comprises a plurality of cells (seven cells in the embodiment shown in FIG. 3) (pieces of equipment; that is, a reverse loader cell 101, a workpiece place cell 102, a stamp cell 103, a place cell 104, a curing cell 105, a workpiece recovery/reverse cell 106, and an unloader cell 107), and a base 108.

The manufacturing line 100 is constituted by means of arranging, on the base 108, the reverse loader cell 101, the workpiece place cell 102, the stamp cell 103, the place cell 104, the curing cell 105, the workpiece recovery/reverse cell 106, and the unloader cell 107 in sequential order of manufacturing processes. The reverse loader cell 101, the workpiece place cell 102, the stamp cell 103, the place cell 104, the curing cell 105, the workpiece recover/reverse cell 106, and the unloader cell 107 are sometimes referred to simply as cells 101 to 107.

Each of the cells 101 to 107 can be constituted by combination of a plurality of element types. Each of the cells 101 to 107 can be constructed by combination of required element types in accordance with specifications required by the manufacturing line 100 or the cells 101 to 107. Moreover, the manufacturing line 100 can be constructed by combination of the cells 101 to 107.

Specifically, the manufacturing line 100 designed with the aid of the design support system 1 is constituted by combination and arrangement of the cells 101 to 107, the cells being constructed by combination of a plurality of element types, in accordance with sequential order of the manufacturing processes.

The configuration of the design support system 1 that is an embodiment of the present invention will now be described by reference to FIG. 1. As shown in FIG. 1, the design support system 1 is equipped with a manufacturing line information preparation section 9, an element type determination section 10, an appearance information preparation section 11, a data exchange section 12, a group of databases 50, a monitor (an indication section, an output section, and a line candidate indication section) 2, a keyboard (a selection section and a condition input section) 3, and a mouse (the selection section and the condition input section) 4.

Specifically, the design support system 1 is implemented by a computer system comprising, e.g., a computer main body (i.e., the manufacturing line information preparation section 9, the appearance information preparation section 11, and the data exchange section 12) 13, the monitor (the indication section, the output section, and a line information storage section) 2, the keyboard (the selection section and the condition input section) 3, and the mouse (the selection section and the condition input section) 4. The group of databases 50 are connected to the computer main body 13 in a communicable manner.

An unillustrated CPU (Central Processing Unit) provided in the computer main body 13 executes a program stored in a hard disk drive (omitted from the drawings) or memory (omitted from the drawings), thereby acting as the manufacturing line information preparation section 9, the element type determination section 10, the appearance information preparation section 11, or the data exchange section 12, all being described later. For the sake of convenience, FIG. 1 shows only an element type database 503, a line database 508, and a common section database 512 in the group of databases 50.

As shown in FIG. 2, in the design support system 1, the group of databases 50 comprises a plurality of databases 501 to 512. Among the plurality of databases 501 to 512, some of the databases are associated with each other by means of specific items, whereby the databases act as a relational database. In FIG. 2, the mutually-associated items are shown as being connected together by means of solid lines.

As shown in FIG. 2, the group of databases 50 comprises a mechanism database 501, a mechanism element database 502, the element type database 503, a component database 504, a two-dimensional drawing information database 505, a visual information database 506, a manufacturing group database 507, the line database 508, an equipment database 509, an examined line database 510, a line candidate database 511, and the common section database 512.

The mechanism database 501 is for registering a mechanism constituting the manufacturing line 100 and comprises an item "PROCESS." The mechanism element data base 502 is for registering mechanism elements and is constituted by means of registering information consisting of items, such as "ELEMENT" and "PROCESS," in an associated manner. The component database 504 is formed by registering information consisting of items; i.e., "PARTS_NUMBER," "UNIT_NUMBER," "MATERIAL," "MANUFACTURER'S DESIGNATION," "MANUFACTURE'S MODEL," "NUMBER OF MACHINING STEPS," "DUE DATE FOR PURCHASE," "PURCHASE PRICE," AND "UNIT PRICE" in an associated manner. The component database 504 can sort and extract information about the components registered in the component database 504 under arbitrary conditions.

The two-dimensional drawing information database 505 is for managing drawing data (i.e., a two-dimensional drawing) pertaining to components registered in the component database 504 and storing information about an engineering drawing of the components in association with the components. The two-dimensional drawing information database 505 is constituted by means of registering information consisting of items; that is, "UNIT_NUMBER" and "a (TWO-DIMENSIONAL) DRAWING," in an associated manner. Here, the drawing data may be stored directly into an item "DRAWING." Alternatively, information representing a position where the drawing data are stored (a pointer, a file designation, an address, or the like) may be stored. Information to be registered in the item "DRAWING" corresponds to information pertaining to the engineering drawing.

The visual information database 506 is for managing design data (three-dimensional data and modeling data) prepared by a three-dimensional CAD of the respective components registered in the component database 504 and is constituted by registering information consisting of items, that is, "UNIT_NUMBER" and "VISUAL INFORMATION," in an associated manner. Here, the modeling data may be stored directly into the item "VISUAL INFORATION," or information (a pointer, a file designation, an address, or the like) representing a location where the modeling data are stored may be stored in the item "VISUAL INFORMATION." Alternatively, the modeling data may be stored in conjunction with information about coordinates of the origin or a standard assembly position. Here, information to be registered in this item "VISUAL INFORMATION" corresponds to information pertaining to the appearance of an element type. The two-dimensional drawing information database 505 and the visual information database 506 may include the component database 504.

The manufacturing group database 507 is for registering a group pertaining to the manufacturing line 100. For instance, an arbitrary number, designation, or a like element used by the operator for management is to be registered in the manufacturing group database 507. The manufacturing group database 507 is constituted of an item "GROUP."

The line database 508 is for registering information to be used for specifying the manufacturing line 100. For instance, an arbitrary number, designation, or a like element used by the operator for management is to be registered in the line database 508. The line database 508 is constituted by means of registering information consisting of items; that is, "LINE" and "GROUP," in an associated manner. The equipment database 509 is for registering information to be used for specifying a cell (equipment). For instance, the equipment database 509 is to register an arbitrary number, designation, or a like element used by the operator for management. The equipment database 509 is constituted by means of registering information consisting of items "EQUIPMENT (DESIGNATION OF EQUIPMENT)," GROUP, "LINE," "TYPE," and "ORDER" in an associated manner. The designation of equipment (EQUIPMENT) is to be input by the operator at the commencement of examination of a design.

The examined line database (a manufacturing line information storage section) 510 is for storing the information prepared by the manufacturing line information preparation section 9 as manufacturing line information 51. The line candidate database 511 is for storing information pertaining to the manufacturing line 100 constituted through the selection and determination operations performed by the operation. The information pertaining to the manufacturing line 100 stored in the examined line database 510 can be extracted and rearranged under arbitrary conditions on the basis of details of the information. The thus-extracted-and-rearranged information pertaining to a manufacturing line can be output to the monitor (a line candidate indication section) 2 or the like as a line candidate (which will be described later).

The common section database 512 is constituted by means of associating with each other information items about specifications or the like (e.g., an electrical interface, the number of drivers, or the number of air pipes), the specifications pertaining to various manufacturing lines 100 whose designs are supported through use of the design support system 1, a plurality of element types (mechanism elements), and components shared among cells (pieces of equipment). Alternatively, the common section database 512 can retrieve and extract components (the base 108 or the power supply unit) satisfying specification requirements by entering the electrical interface, the number of drivers, or the number of air pipes.

The element type database 503 is for storing information pertaining to element types and is constituted by means of storing information, e.g., a conditional expression, performance information [accuracy and an operating speed (tact time)], an incidental expression, and costs, in a mutually-associated manner.

Figure 5:
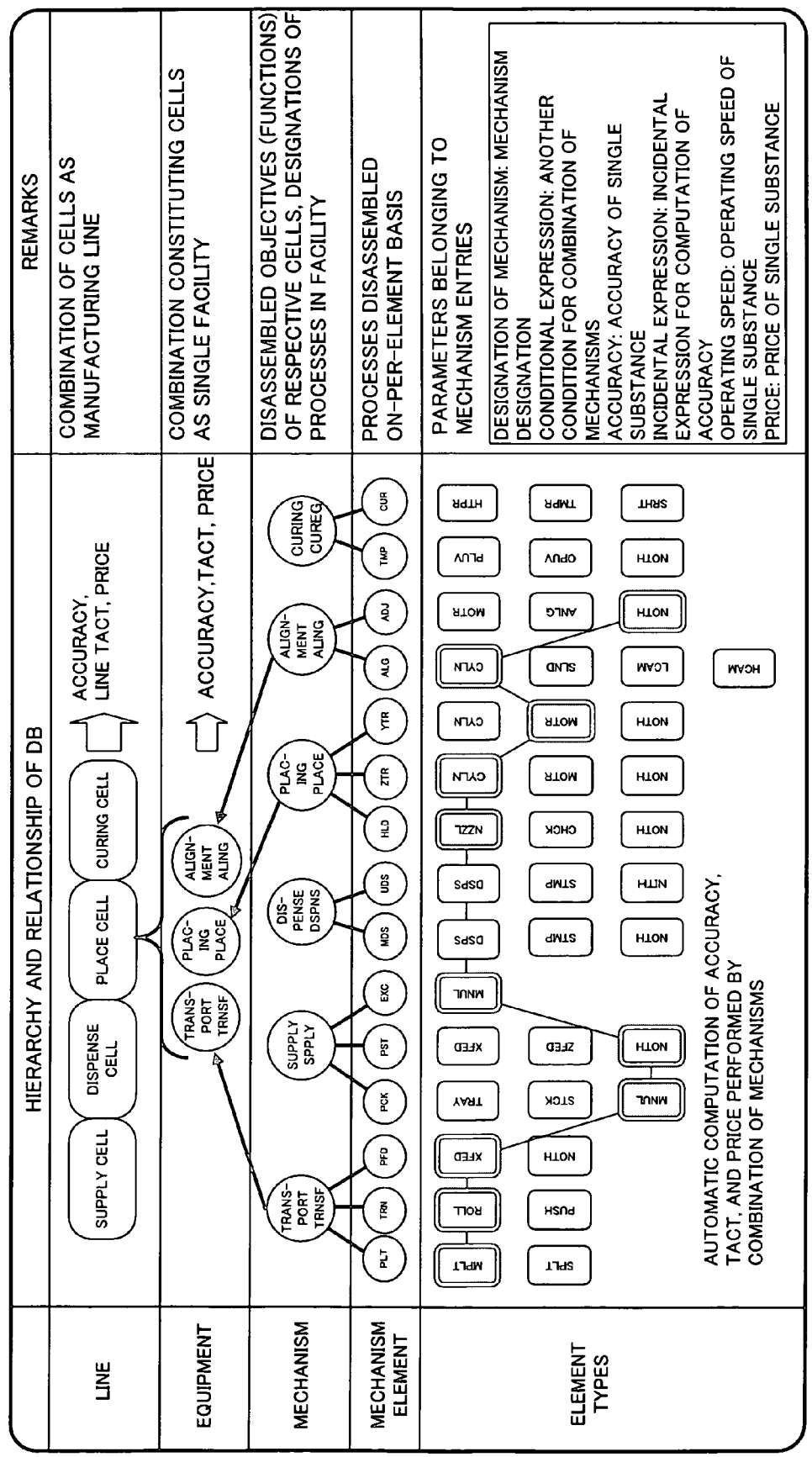
FIG. 5 is a view schematically showing an example configuration of an element type database of the design support system according to the embodiment of the present invention.

FIG. 5 is a view schematically showing an example structure of the element type database 503 of the design support system 1 according to the embodiment of the invention. As shown in FIG. 5, the element type database 503 comprises a hierarchical database structure in accordance with the configuration of the manufacturing line 100.

The respective cells 101 to 107 constituting the manufacturing line 100 are exploded while attention is paid to functions (objectives) of the cells. As a result, the manufacturing line 100 can be separated into six types of processes (mechanisms); that is, a transfer (TRNSF) process, a supply (SUPPLY) process, a dispense (DSPNS) process, a placing (placing; PLACE) process, an alignment (positioning; ALIGN) process, and a curing (provisional curing: CUREG) process. Each cell can be embodied by combination of these processes (mechanisms). For instance, the place cell 104 can be embodied by combination of three mechanisms (processes); that is, the transfer (TRNSF), the placing (PLACE) process, and the alignment (ALIGN) process, from among the six types of processes.

Each of the mechanisms (processes) can be disassembled into a plurality of mechanism elements as a result of being broken down on a per-element basis. For instance, the transfer (TRNSF) mechanism is constituted of three mechanism elements; that is, PLT (a pallet), TRN (transfer), and PFD (pitch feed). Here, PLT represents the types of pallets used in transfer, and TRN represents a transferring method. Each of the mechanism elements is determined and selected from one or two or more element types (MECHANISMs). For instance, the mechanism element PLT is selected from two types of element types; that is, SPLT (a single pallet) and MPLT (a multiple pallet). The mechanism element TRN is selected from two types of element types; that is, a roller (ROLL) and a pusher (PUSH). An element type XFED (an X-axis feeding) is used for the mechanism element PFD.

In FIG. 5, an element type "NOTH" shows no element type (NOTHING). Element types enclosed by a thick line in FIG. 5 are shown as being selected as element types constituting the manufacturing line 00 (i.e., the place cell 104). Specifically, in the embodiment shown in FIG. 5, the place cell 104 of the manufacturing line 100 is selected such that the transfer mechanism (process) employs a multiple pallet (MPLT) as the mechanism element PLT (pallet); such that the roller (ROLL) is used as the mechanism element TRN (transfer movement), and an X-axis feeding mechanism (XFED) is used as the mechanism element PFD (pitch feed).

Similarly, as shown in FIG. 5, the placing mechanism (process) and the alignment mechanism (process), both constituting the place cell 104, are also constituted of a plurality of constituent elements. Moreover, the constituent elements are determined and selected from one or two or more element types.

In the design support system 1, the operator (e.g., a person who determines specifications or a designer) sequentially selects optimum element types for respective constituent elements through use of the keyboard (selection section) 3 and the mouse (selection section) 4, thereby designing or examining the manufacturing line 100.

In the embodiment, the element type database 503 is configured by means of registering, in association with the element types (MECHANISMs), information items (information about element types) consisting of items, e.g., ELEMENT (designation), CONDITION 1 (computational conditional expression 1), CONDITION 2 (computational conditional expression 2), CONDITION 3 (computational conditional expression 3), DRIVER (the number of motor drivers), IO_PINS (the number of I/O pins), AIR (the number of air pipes), X_ACCURRACY (the accuracy of repeated operation in the direction X), Y_ACCURACY (the accuracy of repeated operation in the direction Y), FORMULA (a formula for computing a machining speed), WORKTIME (a machining time), PRICE (manufacturing unit price), PICTURE (visual information), COMMENT (comments for describing elements), and UNIT_NUMBER (unit number; a number assigned to an aggregation of components).

The information items have been stored in the element type database 503 beforehand. When the operator selects element types through use of the keyboard (selection section) 3 and the mouse (selection section) 4, the information items are displayed on the monitor (indication section) 2. As a result, the operator can readily ascertain whether or not element types match the processes. As will be described later, the information items are also used for ascertaining the performance and specifications of the manufacturing line 100 or for automatically selecting a common equipment section.

PICTURE (visual information) pertains to the appearance of the element type and, for instance, data pertaining to a diagram schematically showing appearance of equipment. In the embodiment, the visual information database 506 and the two-dimensional drawing information database 505 are linked to the element type database 503. When more detailed information about the appearance of the element type is required, a drawing or modeling data can be referred to. PICTURE may store illustration data schematically showing the shape of the element type, a pointer showing an address where the illustration data are to be stored, or a destination of a link.

When a specific element type has been selected as a mechanism element, information to be reflected on an element type pertaining to another mechanism element (i.e., determination information) is stored in CONDITION 1 (conditional expression 1, and incidental expression 1), CONDITION 2 (conditional expression 2, and incidental expression 2), and CONDITION 3 (conditional expression 3, and incidental expression 3). The element type determination section 10 determines other constituent elements and specifications thereof on the basis of the determination information.

The design support system 1 employs two types of information (expressions) as the determination information; that is, a conditional expression and an incidental expression. Here, the conditional expression is information pertaining to another constituent element or another element type, both complying with the selected element type, which would otherwise be caused when a certain element type has been selected. Specifically, a condition or the like which should be applied to a specific constituent element or element type with high priority in response to the selected element type is registered as a conditional expression.

The incidental expression is information to be used for preventing reflection of information about a specific constituent element or element type in response to the selected element type, which would otherwise be caused when a certain element type has been selected. For instance, when accuracy required as performance of an apparatus is to be computed, computation must be performed by means of canceling repeatability of another mechanism section through use of a feature (i.e., perception of alignment or the like) of the element type. In this case, information for specifying information to be cancelled in terms of accuracy is registered as an incidental expression.

In design support system 1, determination information has been registered in the element type database 503 beforehand in association with the element types, as required. At the time of examination of the manufacturing line 100, specifications and configuration of the manufacturing line 100 are selected by reference to the determination information. Thus, there can be prevented an impossible combination of constituent elements in terms of design or occurrence of meaningless combination of constituent elements.

Figure 6:
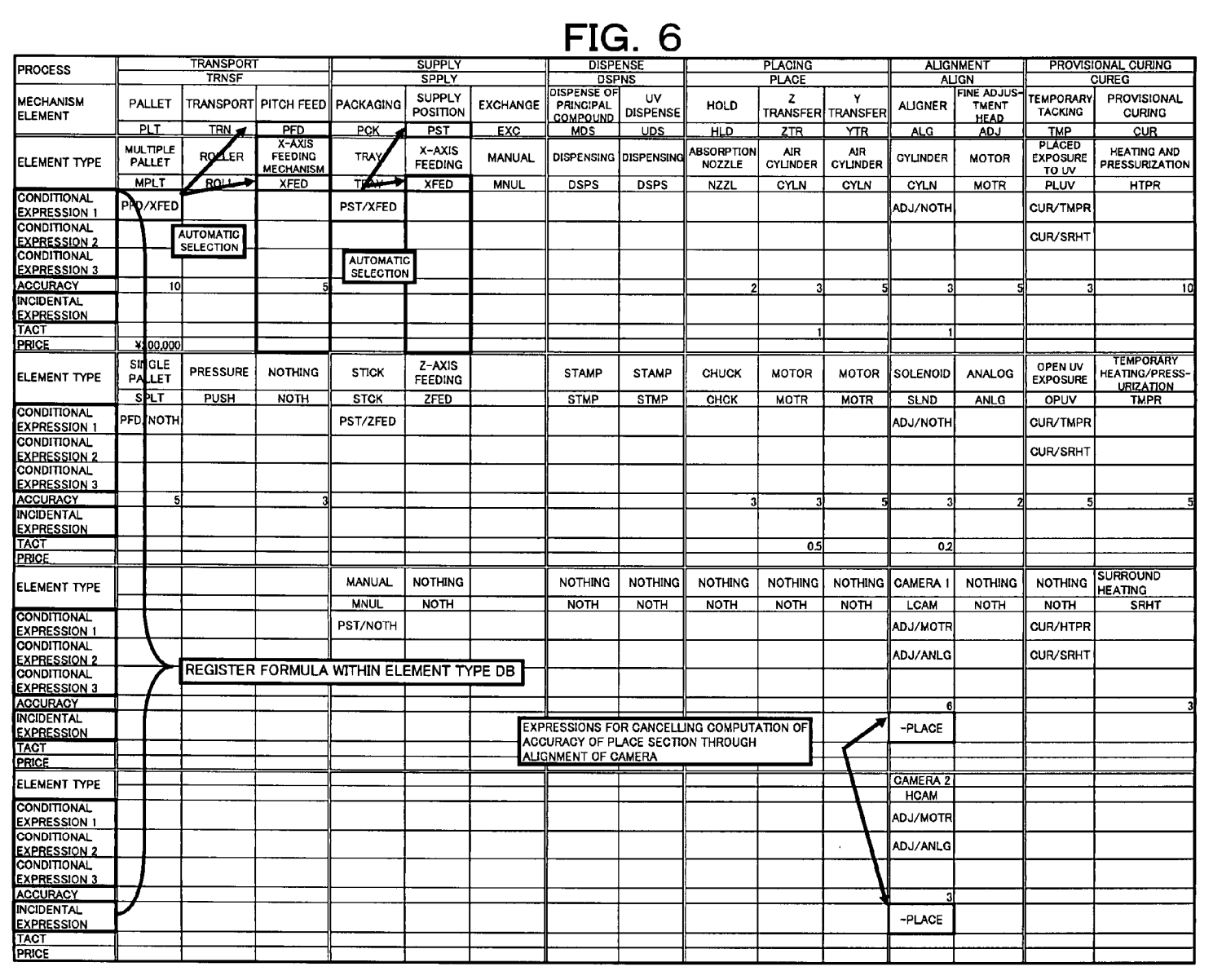

FIG. 6 is a view showing an example of the element type database 503 in the design support system 1, which is an embodiment of the present invention and is to be used for describing the determination information. In FIG. 6, a plurality of mechanism elements constituting each process are shown in connection with the respective processes constituting the manufacturing line 100 [e.g., a transfer process, a supply process, a dispensing process, a placing process, a positioning process, and a provisional curing (hardening) process]. Selectable element types and information items which have been registered in the element type database 503 beforehand in connection with the element types are represented in tabular form on a per-mechanism-element basis.

As shown in FIG. 6, in relation to an element type "multiple pallet (MPLT)," which is a constituent element (PLT) in the transfer process, PFD/XFED is registered in a conditional expression 1 of the element type. This conditional expression "PFD/XFED" signifies that PFD is to be selected for the element type "pitch feed" or that XFED is to be selected for an "X-axis feeding mechanism." In accordance with this conditional expression 1, the element type determination section 10 sets "PDF" as the element type "pitch feed" in the transfer process or "XFEED" as "X-axis feeding mechanism" in the transfer process.

Specifically, in the design support system 1, the element type determination section 10 determines element types or specifications of elements in accordance with determination information, such as CONDITION 1 (computational conditional expression 1), CONDITION 2 (computational conditional expression 2), and CONDITION 3 (computational conditional expression 3). On the basis of the determination information registered in association with the selected element type, another element type or specifications of an element type are (automatically) determined.

Similarly, in the embodiment shown in FIG. 6, "PFD/XFED" is registered in a conditional expression 1 of an element type "Packaging (PCK)" in, e.g., the supply process. The conditional expression "PFD/XFED" signifies that "PFD" is to be selected as the element type "pitch feed" or "XFED" is to be selected as an "X-axis feeding mechanism." In accordance with the conditional expression 1, "PFD" is automatically selected and set for the element type "pitch feed" in the transfer process, or "XFED" is automatically selected and set for the element type "X-axis feeding mechanism."

In the positioning process, "-PLACE" is registered in respective incidental expressions of element types "CAMERA 1 (LCAM)" AND "CAMERA 2 (HCAM)." This signifies that the value of accuracy (computation of accuracy) acquired in the placing process is cancelled (not used). When a camera is used for positioning, positioning can be directly effected on the basis of an image captured by the camera. Hence, there is no necessity for taking accuracy into consideration in the placing process.

New information about an element type or a new element type can be readily added to the element type database 503. For instance, when a new element type is designed or when a design modification is made on an existing element type, the information is entered through use of the keyboard 3 and the mouse 4, or information is acquired from an external system (i.e., an information processing system, a design system, or a production management system) by way of the data exchange section 12, which will be described later, whereupon the information is stored in the element type database 503.

The thus-newly-added information or the thus-modified information can be used immediately after registration or modification, by way of a computer system (e.g., the design support system 1) connected to the element type database 503 in a communicable manner.

The manufacturing line information preparation section 9 acquires information about the element type stored in the element type database 503 on the basis of the element type selected by the keyboard 3 and the mouse 4, thereby preparing information about the manufacturing line 100. More specifically, mechanisms to be used for embodying processes; i.e., a transfer (TRANSF) process, a supply (SPPLY) process, a dispense (DSPNS) process, a placing (placing; PLACE) process, an alignment (positioning, ALIGN) process, and a curing (provisional curing, CUREG) process, are prepared by combination of the element types selected by means of the keyboard 3 and the mouse 4. Moreover, the respective cells 101 to 107 are prepared by combination of these mechanisms. Further, the manufacturing line 100 is constituted by combination of the cells 101 to 107.

The manufacturing line information preparation section 9 computes information (e.g., accuracy, an operating speed, or a processing time) about performance of the thus-manufactured manufacturing line 100 and manufacturing costs (costs) thereof. The manufacturing line information preparation section 9 prepares information (a table of specifications and performance, which will be hereinafter often referred to also as "information about a manufacturing line") in a form such that the information can be indicated on the monitor (indication section) 2; such that the information can be output from an unillustrated printer; or such that the information can be output to another external system (e.g., a purchasing system, a production management system, or a cost simulation system) by means of the database exchange section 12.

The information about the manufacturing line 100 prepared by the manufacturing line information preparation section 9 is stored in the line database 508 as manufacturing line information 51.

The manufacturing line information preparation section 9 also has the function of the element type determination section 10 that determines an element type or specifications thereof on the basis of the element type selected by means of the keyboard 3 and the mouse 4.

On the basis of the element type selected by the operator through use of the keyboard 3 and the mouse 4, the element type determination section 10 acquires from the element type database 503 various information items pertaining to the element type, thereby determining other element types required to build the manufacturing line 100, specifications of the element types, constituent elements, or the like. For instance, the element type determination section 10 summates a value of DRIVER (the number of motor drivers), a value of IO_PINS (the number of input/output pins), and a value of AIR (the number of air pipes), thereby calculating the electrical interface, the number of drivers, and the number of air pipes, which are required by the equipment common section (e.g., the base 108 or the like) with respect to the respective selected element types. Moreover, when a plurality of types of the bases 108 are available, an optimum base 108 is (automatically) selected on the basis of the result of calculation.

Figure 7:
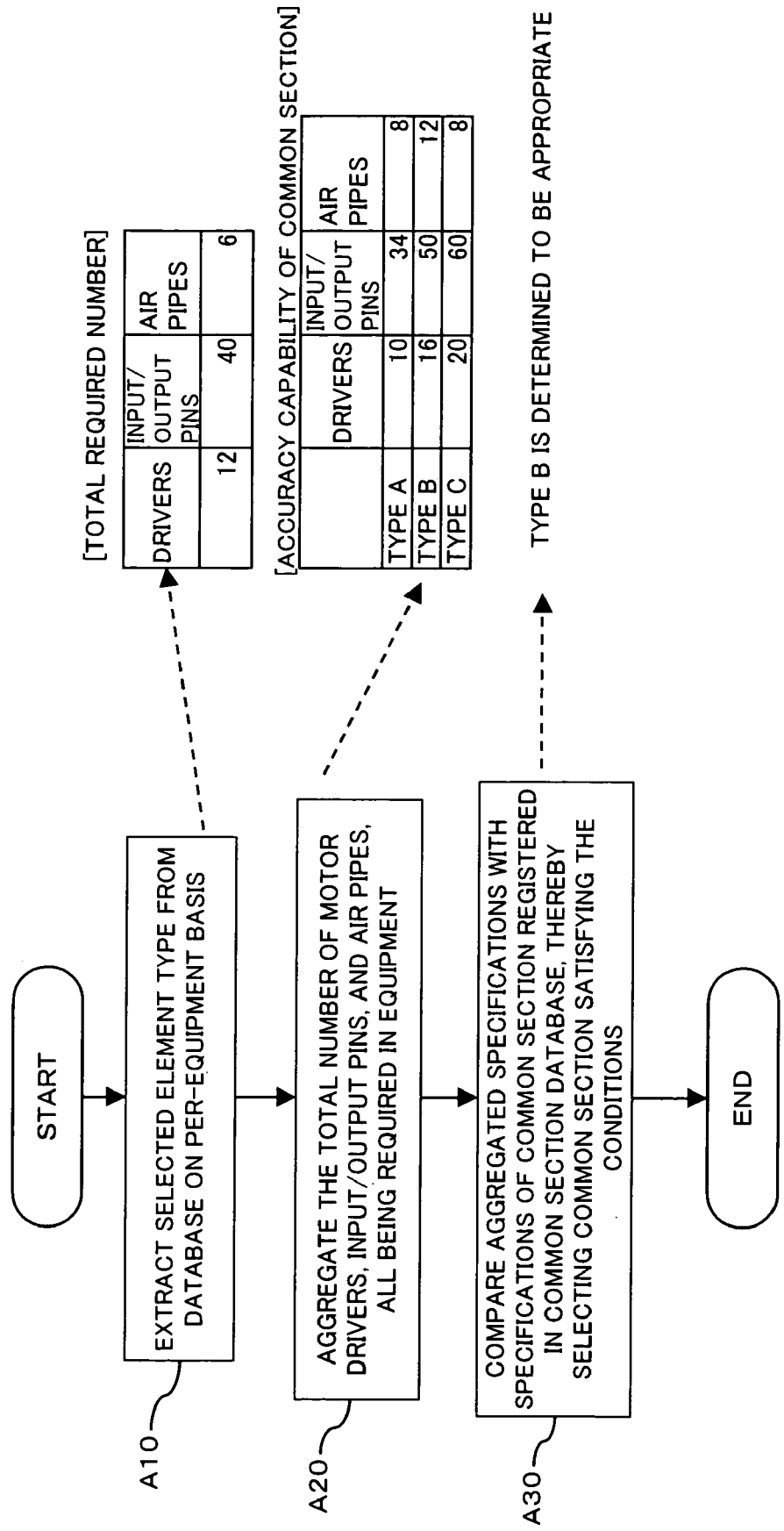
FIGS. 7A and 7B are views for describing a technique for selecting a base by means of an element type determination section in the design support system according to the embodiment of the present invention.

Here, in accordance with a flowchart (steps A10 to A30) shown in FIG. 7A, there will be described a technique for selecting the base 108 by means of the element type determination section 10 in the design support system 1, which is an embodiment of the present invention, by reference to FIG. 7B. FIG. 7B is a view showing example information computed by the element type determination section 10 in the design support system 1, which is an embodiment of the present invention, during the course of selection of the base 108. Alternatively, in the present embodiment, there will be described the technique for selecting the base 108 on which the plurality of element types are to be attached.

When the operator has selected element types to be used in the manufacturing line 100 through use of the keyboard 3 and the mouse 4, the element type determination section 10 extracts information about, e.g., the number of motor drivers, the number of input/output pins, and the number of air pipes by reference to the element type database 503 in connection with the thus-selected respective element types (step A10).

The element type determination section 10 summates information items about, e.g., the number of motor drivers, the number of input/output pins, and the number of air pipes, on a per-cell (equipment) basis, thereby determining specification conditions (step A20). In the embodiment shown in FIG. 7B, results of summation (i.e., the specification conditions and the total number of required elements) are assumed to be as follows: a total number of required motor drivers is 12; a total number of required input/output pins is 40; and a total number of required air pipes is six. By reference to the common section database 512, the element type determination section 10 acquires information about a plurality of bases 108 (three types of bases; that is, a base of type A, a base of type B, and a base of type C in the embodiment shown in FIG. 7B) registered in the common section database 512, thereby acquiring information about the number of motor drivers, the number of input/output pins, and the number of air pipes in connection with the respective bases (the base of type A, the base of type B, and the base of type C) (see FIG. 7B).

On the basis of the information registered in the common section database 512, the element type determination section 10 selects the base 108 satisfying the summated specification conditions (step A30). In the embodiment shown in FIGS. 7A and 7B, the element type determination section 10 selects the base 108 of type B satisfying specification conditions.

The element type determination section 10 also determines an element type or specifications of an element type on the basis of the determination information pieces determined according to CONDITION 1 (computational conditional expression 1), CONDITION 2 (computational conditional expression 2), and CONDITIONAL 3 (computational conditional expression 3). As described by reference to FIG. 6, on the basis of the determination information registered in association with the selected element type, another element type or specifications of an element type are determined.

Moreover, on the basis of the information pertaining to the element types preserved in the element type database 503, the manufacturing line information preparation section 9 selects from among a plurality of elements types an element type satisfying requirements input by means of the keyboard (condition input section) 3 and the mouse (condition input section) 4. On the basis of the thus-selected element type, the information pertaining to the manufacturing line 100 is prepared.

The operator can enter specifications of the manufacturing line 100 (e.g., a price and a tact time) through use of the keyboard 3 and the mouse 4. By reference to the manufacturing line information 51 registered in the line database 508, the manufacturing line information preparation section 9 ascertains whether or not there exists the manufacturing line 100 satisfying the specifications. When the manufacturing line 100 satisfying the specifications exists, information pertaining to the manufacturing line 100 is acquired, thereby indicating the information, as line candidates, to the operator by way of the monitor 2, a printer, or the like.

When no manufacturing line 100 satisfying the specifications exists, the manufacturing line information preparation section 9 performs a trial calculation of a combination of the manufacturing line 100 through use of the element types registered in the element type database 503. The manufacturing line 100 satisfying the specifications is indicated as a line candidate to the operator by way of the monitor 2, a printer, or the like.

At the time of preparation of such a line candidate, occurrence of an impossible combination of element types is hindered by determining specifications of a line candidate while reflecting the determination information (i.e., conditional expressions and incidental expressions) registered in the element type database 503, and the number of manufacturing lines 100 prepared as line candidates can be narrowed down and reduced. Alternatively, when the line candidate is indicated to the operator, the manufacturing lines 100, which are candidates for a line, are preferably indicated after having been sorted, narrow-down retrieved, or the like according to specifications, such as cost, tact time, or the like, or various conditions employed in the manufacturing line 100, such as element types.

On the basis of the element type database 503, the appearance information preparation section 11 prepares information pertaining to engineering drawings of the manufacturing line 100 on the basis of the engineering drawings of the element types registered in the visual information database 506. Specifically, the appearance information preparation section 11 acquires three-dimensional CAD data pertaining to the respective element types, by reference to the visual information database 506 and on the basis of the element types selected and determined by means of the keyboard 3, the mouse 4, and the manufacturing line information preparation section 9 (i.e., the element type determination section 10). Three-dimensional CAD data (appearance information) pertaining to respective cells or three-dimensional CAD data (appearance information) pertaining to the manufacturing line 100 are prepared by combination of the three-dimensional CAD data sets.

Information about coordinates of the origin and a standard assembly position is stored in the visual information database 506 along with the three-dimensional CAD data. Hence, on the basis of information about a point of origin or the standard assembly position, the appearance information preparation section 11 can readily and reliably combine together the three-dimensional CAD data (modeling data) pertaining to respective element types.

The thus-prepared three-dimensional CAD data are indicated to the operator in a browsable manner by means of the monitor 2; are printed by means of an unillustrated printer; or are transferred to an external information processing system, such as a design system (omitted from the drawings) by way of the data exchanged section 12.

The operator can ascertain the appearance of the manufacturing line 100 or the appearances of respective cells (pieces of equipment) by means of examining the thus-prepared modeling data, thereby achieving a high degree of convenience.

The data exchange section 12 is for exchanging various pieces of information between the design support system 1 and an external system (an external information processing system; e.g., a purchasing system, a production management system, a design system, a cost simulation system, or the like) and implements an interface function. Specifically, the data exchange section 12 exchanges information, such as information about components constituting the respective element types and the number of components employed, with the external information processing system, such as the purchasing system and the production management system. The data exchange section 12 is arranged to exchange information about engineering drawings (e.g., two-dimensional CAD data, three-dimensional CAD data, drawing numbers, file names, or the like) with the design system.

The monitor 2 is connected to the computer main body 13 and is for indicating various information items to the operator through display. In addition to acting as an indication section for indicating the element types stored in the element type database 503 to the operator in a selectable manner, the monitor 2 also acts as an output section capable of outputting information about a manufacturing line prepared by the manufacturing line information preparation section 9. Moreover, the monitor 2 displays (outputs) information about engineering drawings of components or information about the appearance of the manufacturing line 100 prepared by the appearance information preparation section 11.

The keyboard 3 and the mouse 4 are connected to the computer main body 13 and are to be used by the operator to perform various input operations. In addition to acting as an selection section which enables the operator to select arbitrary element types to be used for constituting the manufacturing line 100 from among the element types indicated to the operator by means of the monitor 2, the keyboard 3 and the mouse 4 also act as a condition input section which enables the operator to enter conditions pertaining to preparation of information about the manufacturing line information preparation section 9 and the manufacturing line 100.

In the design support system 1 that serves as an embodiment of the present invention having the foregoing configuration, various data sets are previously registered in the mechanism database 501, the mechanism element database 502, the element type database 503, the component database 504, the two-dimensional drawing information database 505, and the visual information database 506. The operator designs a manufacturing line through use of the previously-registered information items.

Figure 8:
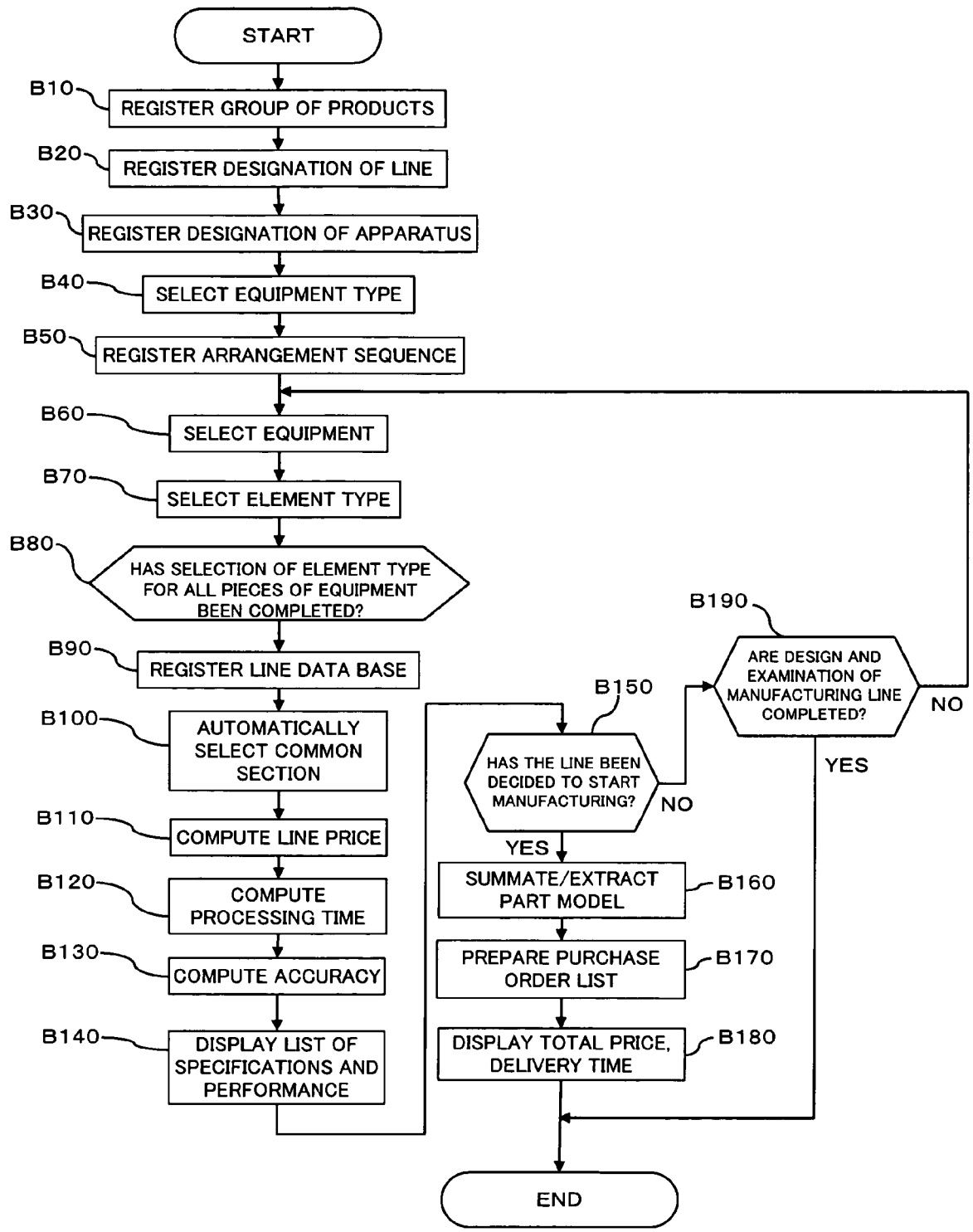
FIG. 8 is a flowchart for describing a technique for supporting the design of a manufacturing line which is employed in the design support system according to the embodiment of the present invention.
Figure 10:
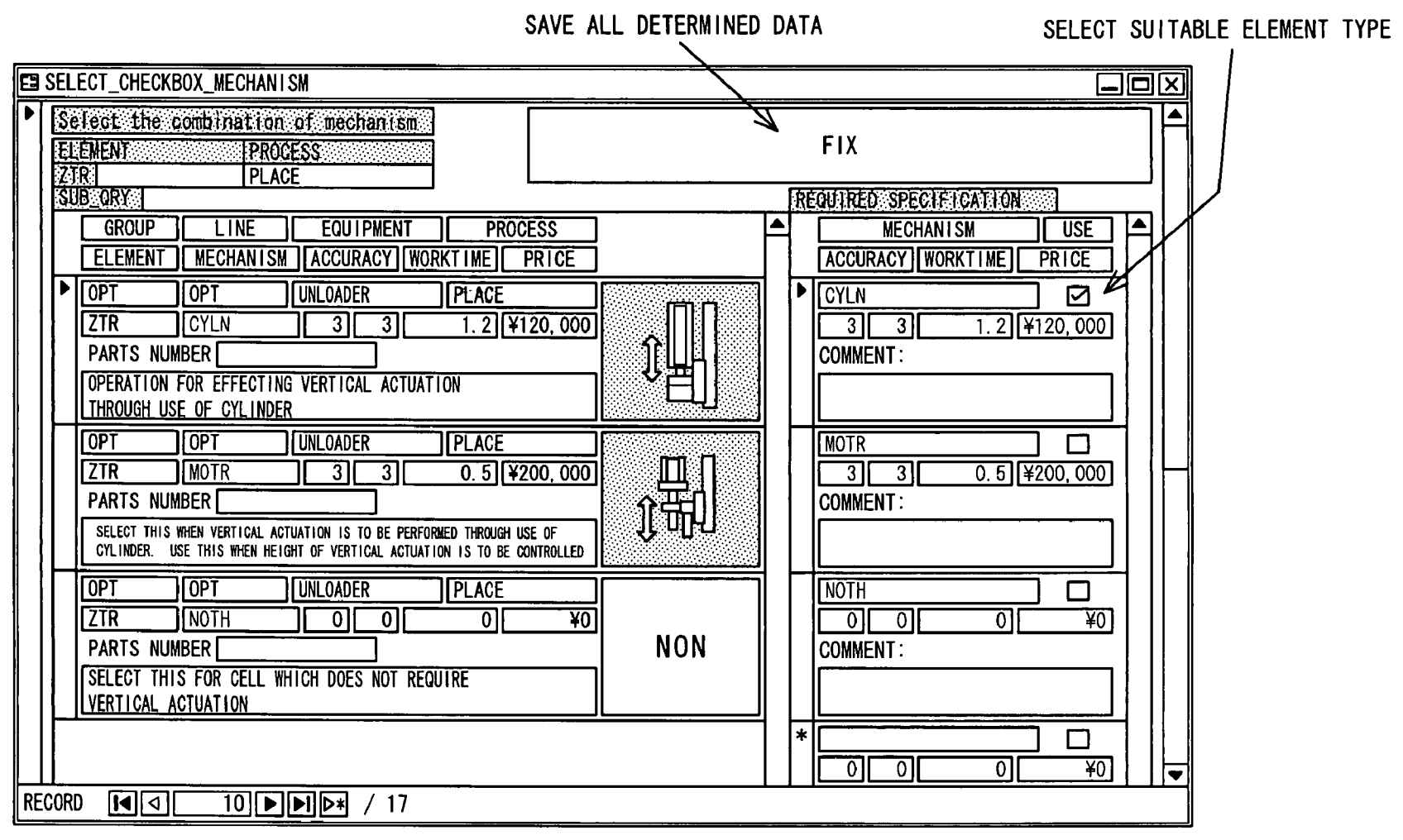
Figure 11:
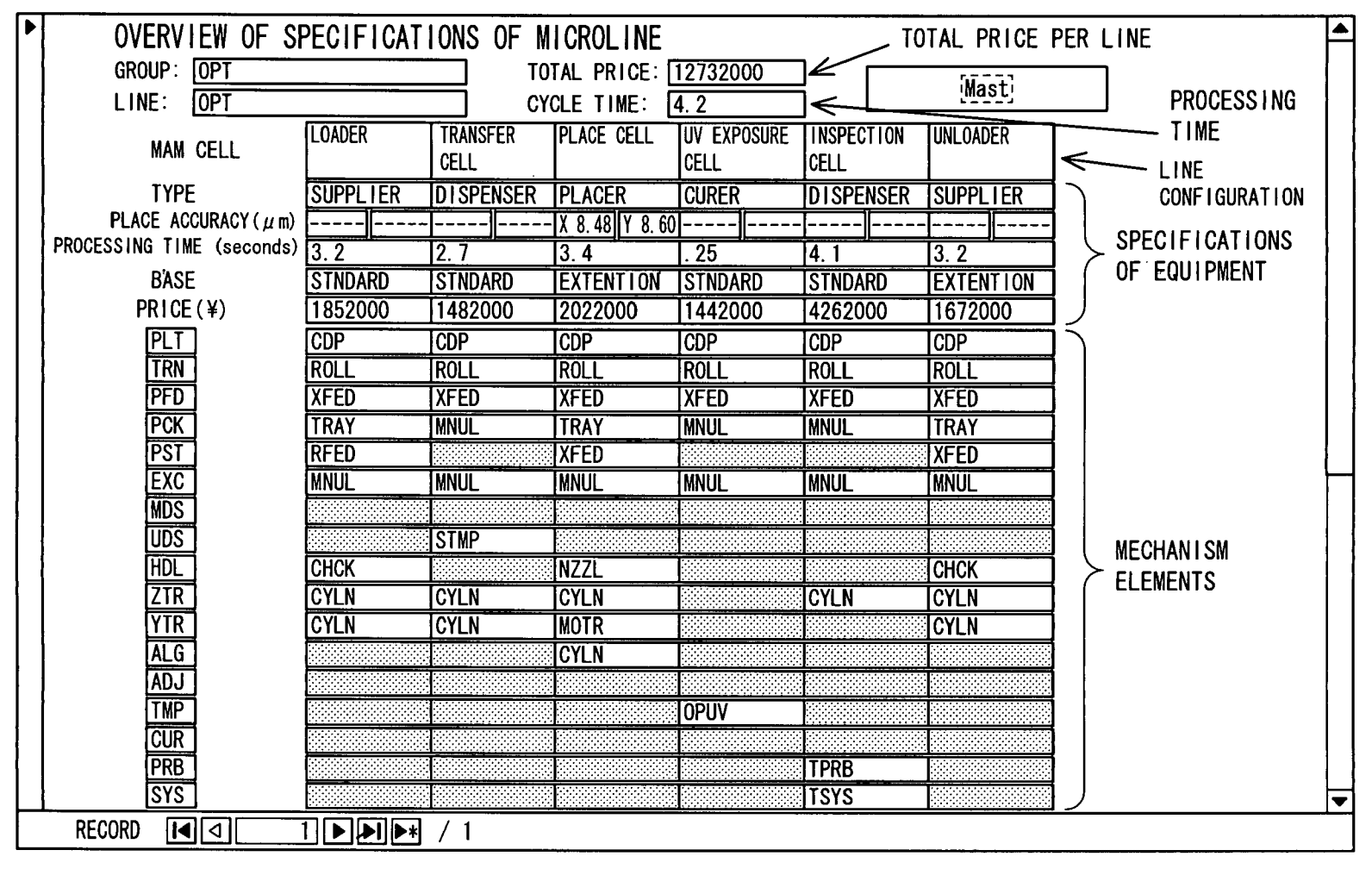

Here, the manufacturing line design support technique employed by the design support system 1 that is an embodiment of the invention will be described in accordance with a flowchart (steps B10 to B190) shown in FIG. 8 and by reference to FIGS. 9, 10 and 11. FIGS. 9 through 11 are drawings showing an example input screen in the design support system 1 that is an embodiment of the present invention. FIG. 9 is a view showing an example screen for registering the manufacturing line 100, the designation of equipment (cell), and a process sequence or the like. FIG. 10 is a view showing an example screen to be used for selecting the configuration of equipment (cell) constituting the manufacturing line 100. FIG. 11 is a view showing an example display of specifications of the manufacturing line 100.

In the design support system 1, an input screen (see FIG. 9) is displayed on the monitor 2. At the time of examination of the design of the manufacturing line 100, the operator registers the designation of the manufacturing line 100 to be examined and a group (LINE/GROUP, GROUP) on the input screen, as well as registering the designation (EQUIPMENT) of pieces of equipment (cells) constituting the manufacturing line 100. Moreover, the type (TYPE) of equipment and a process sequence (ORDER) (steps B10 to B50) are also registered.

The information items input in steps B10 to B50 are registered in the manufacturing group database 507, the line database 508, and the equipment database 509, respectively.

Next, the designation and group of the manufacturing line are selected on the input screen (see FIG. 10) displayed on the monitor 2, whereby optimum element types are selected for each of the pieces of equipment constituting the manufacturing line 100. At a point in time at which selection of the element types for all the pieces of equipment constituting the manufacturing line 100 has been completed, the configuration is made firm (FIX), and data are stored (saved (steps B60 to B90)). Here, selection of an element type constitutes selection of an element type which is determined to be optimum from among the element types registered in the element type database 503. Alternatively, the configuration of the manufacturing line 100 that has been made firm is registered in the examined line database 510.

On the basis of the element type selected by the operator through use of the keyboard 3 and the mouse 4, the element type determination section 10 acquires various information items pertaining to the element type from the element type database 503 and automatically selects an equipment common section; e.g., the base 108 or the like (step B100).

On the basis of the element type database 503 and the component database 504, the manufacturing line information preparation section 9 computes the cost (manufacturing cost), processing time and the accuracy of the manufacturing line 100 (steps B110 to B130). The information items are displayed on the monitor 2 in the form of a list of specifications and performance (i.e., a specification overview) (step B140). The operator can readily ascertain specifications and performance (performance and costs) of the manufacturing line 100 on the display screen such as that shown in, e.g., FIG. 11.

In the embodiment shown in FIG. 11, the configuration of the manufacturing line 100 and specifications and mechanism elements of each of the pieces of equipment (cells) are displayed. Moreover, the accuracy, processing time, and costs of each of the cells are configured in the form of a list. Further, the total price and processing time of the manufacturing line can also be ascertained. Alternatively, the list of specifications and performance of the thus-prepared manufacturing line 100 may be transferred to an unillustrated cost simulation system by means of the database exchange section 12.

The operator determines whether to manufacture the thus-examined-and-designed manufacturing line 100 (step B150) When manufacture of the manufacturing line 100 is not to be performed (when NO is selected in step B150), a determination is made to as to whether or not design and examination of the manufacturing line 100 are to be completed (step B190). When design and examination of the manufacturing line 100 is considered to have been completed (when YES is selected in step B190), processing is terminated. Alternatively, when design and examination of the manufacturing line 100 is considered to not have been completed (when NO is selected in step B190), processing proceeds to step B60.

When the manufacturing line 100 is to be manufactured (when YES is selected in step B150), the design support system 1 summates and extracts the information required to manufacture the manufacturing line 100 (e.g., model numbers of parts employed and the number of parts employed) on the basis of the examined line database 510 (step B160). For instance, a purchase order list is prepared in connection with purchases or the like (step B170). Here, the purchase order list is transferred to, e.g., the purchasing system by way of the data exchange section 12 or a manufacturing department for manufacturing components as a manufacturing instruction.

When an answer, such as a cost or a delivery date, is provided by the purchasing system or the component manufacturing department in response to the purchase order or instruction, the final total price and delivery date of the manufacturing line 100 are determined and displayed on the monitor 2 (step B180) on the basis of that information, whereupon processing is terminated.

Moreover, in the design support system 1, specifications (a processing speed, accuracy, cost, or the like) required by the manufacturing line 100 are entered, whereby the manufacturing line information preparation section 9 computes a combination of element types satisfying the specifications and combines the element types. Thus, a candidate for the manufacturing line 100 satisfying the specifications is indicated to the operator.

Specifically, when the operator has entered specifications of a line, the manufacturing line information preparation section 9 first retrieves the examined line information database 510, thereby ascertaining whether or not the manufacturing line 100 satisfying the specifications is already stored. If the manufacturing line 100 satisfying the specifications has already been registered in the examined line information database 510, the information about the manufacturing line 100 is indicated as a line candidate to the operator.

When the manufacturing line 100 satisfying the specifications is not registered in the examined line information database 510, the manufacturing line information preparation section 9 performs a trial calculation of a combination of the manufacturing line 100 through use of the element types registered in the element type database 503, thereby indicating the manufacturing line 100 satisfying the specifications as a line candidate to the operator by way of the monitor 2 or a printer. The operator determines specifications of the manufacturing line 100 by means of ascertaining details of specifications in relation to the line candidate displayed on the monitor 2 or the like.

Further, cost-reduction of each of the element types can also be examined by means of the design support system 1. In general, there may be a case where a manufacturer from which components of an element type completed as a single feature are to be purchased is changed at a later time in order to curtail costs. In such a case, details of the component database 504 which are linked to the element types while "UNIT_NUMBER" appended to the element types is taken as a key are displayed on the monitor 2. Thus, information about all the components constituting the element types (e.g., material, a manufacturer's designation, a manufacturer's model, the number of machining steps, a due date for purchase, a purchase price, and a unit price) is displayed. Alternatively, a plurality of components constituting the element type may be produced in the form of a list in descending order of unit price from a higher price to a lower price.

On the basis of the information items, the operator can smoothly and readily examine cost reduction or change or registration of a component or a supplier from which the component is to be purchased.

There may be a case where modifications are made to details of the engineering drawing (i.e., alleviation of a designated dimensional allowance, realization of the engineering drawing in the form of sheet metal, or the like) during such an examination for cost reduction, to thereby make an attempt to reduce the number of machining steps. In the design support system 1, drawing data or a modeling database is displayed on the monitor 2 or printed through use of a printer or the like on the basis of the two-dimensional information database 505 or the visual information database 506.

The operator compiles, on the spot, areas of the parts to be changed; approximates a reduction in the number of processing steps; and registers substitutes for formerly included parts by reference to the drawing data or the modeling data output from the monitor 2 or the printer, thereby reviewing cost reduction.

As mentioned above, according to the design support system 1 that serves as an embodiment of the invention, the operator selects element types to be used for constituting the manufacturing line 100, through use of the keyboard 3 and the mouse 4 while viewing the monitor 2, whereby the manufacturing line 100 comprising a variety of processes can be efficiently examined, determined, or established.

The manufacturing line 100 is constituted by combination of the element types previously registered in the element type database 503; that is, the element types whose development has already been completed. Hence, sharing of the components can be pursued, and original design (i.e., new design) can be minimized. As a result, manufacturing costs can be curtailed, and the time required to design and manufacture the manufacturing line 100 can be shortened.

As shown in FIG. 11, specifications and performance of the manufacturing line 100 that is under examination can be readily ascertained. The specifications and performance of the manufacturing line 100 constructed by the operator can be readily ascertained. Therefore, the manufacturing line 100 can be designed readily and within a short period of time so as to be highly convenient and to satisfy required specifications and performance.

Specifically, the manufacturing line 100 can be provided within a short period of delivery time and at low cost through use of the design support system 1.

Information to be reflected on element types pertaining to another mechanism element (i.e., determination information) is stored with respect to element types in the element type database 503. The determination information is reflected at the time of construction of the manufacturing line 100, thereby preventing occurrence of an impossible combination of constituent elements in view of design or construction of the manufacturing line from a meaningless combination. Thus, reliability of the design support system can be enhanced.

When a necessity arises for developing a new process and incorporating the new process into equipment, a process developed by a specification examiner (i.e., a developer) is designed as a specific mechanism and completed as an element type. The thus-completed element type is sequentially registered, as a part of mechanism elements and drawings, in the element type database 503, the component database 504, the two-dimensional drawing information database 505, and the visual information database 506. As a result, the mechanism element can be immediately combined with another mechanism element and perform a function as equipment. More specifically, the process newly developed as an element type which is a part of equipment can be immediately used by the specification examiner on the spot for another application, thereby achieving a high degree of convenience. Alternatively, when many designers (specification examiners) are involved, information about the equipment (element type) produced by one designer can be shared among the plurality of designers, thereby achieving a high degree of convenience. Moreover, equipment whose performance differs from that of existing equipment can be constructed by developing an element type which serves as the basic unit of a process.

Examination of cost reduction of individual element types can be performed smoothly and readily.

Moreover, the manufacturing line 100 constructed by the design support system 1 is linked to the component database 504 or the like in connection with all the components constituting the manufacturing line 100. Hence, a list of components constituting the manufacturing line 100 (a parts list) can be prepared readily and accurately. Alternatively, overlapping components can be readily sorted or summated. Hence, at the time of request for manufacture of the manufacturing line 100, a request for manufacture and placement of an order can be automated.

In relation to purchases, if the design support system 1 is operated in conjunction with, e.g., an external purchasing system, a request for purchasing components can be made smoothly by utilization of contact information of manufacturers registered in the purchasing system (i.e., a database) or the like, whereby a time required to place purchase orders on a per-component basis can be diminished.

Moreover, the element type determination section 10 acquires various information items about element types from the element type database 503 on the basis of the element types selected by the operator through use of the keyboard 3 and the mouse 4, thereby automatically determining other element types required to constitute the manufacturing line 100 and specifications of the element types (e.g., an electrical interface, the number of drivers, and the number of air pipes), constituent elements, or the like. Thus, a high degree of convenience can be achieved, or design quality can be enhanced without involvement of a design failure or the like.

The element type database 503 stores processes (equipment, manufacturing steps) in the manufacturing line 100 and element types relevant to the processes in association with each other. Further, the processes are hierarchically managed, whereby data pertaining to element types can be managed in the form identical with the construction of an actual manufacturing line 100 and, hence, a high degree of convenience is achieved.

The element type database 503 stores information about engineering drawings of the element types in association with the same, whereby the operator can readily refer to and use the engineering drawings and enjoy a high degree of convenience.

The component database 504 stores information about the engineering drawings (i.e., the two-dimensional CAD data and the modeling data) of the components in association with the same. Information about the engineering drawings of the components are output to the monitor 2, whereby modifications in use of the components can be readily examined. Hence, an examination for curtailing (reducing) the manufacturing costs of the components can be readily performed.

On the basis of the element types selected and determined by means of the keyboard 3, the mouse 4, and the manufacturing line information preparation section 9 (the element type determination section 10), the appearance information preparation section 11 acquires three-dimensional CAD data pertaining to the respective element types by reference to the visual information database 506. By means of a combination of the three-dimensional CAD data sets, the three-dimensional CAD data (appearance information) about the respective cells and three-dimensional CAD data (appearance information) about the manufacturing line 100 are prepared. Therefore, the operator can readily ascertain the appearance of the manufacturing line 100, thereby achieving a high degree of convenience.

By means of the data exchange section 12, information about the components constituting the respective element types or the number of components employed is exchanged with an external information processing system, such as a purchasing system or a production management system. Further, the data exchange section 12 exchanges information about the engineering drawing (i.e., the two-dimensional CAD data, the three-dimensional CAD data, a drawing number, the file name, or the like) with a design system. Therefore, the information about the manufacturing system 100 prepared by the design support system 1 can be effectively utilized, thereby achieving a high degree of convenience.

Information about the manufacturing line 100 prepared by the manufacturing line information preparation section 9 and information about manufacturing costs of the manufacturing line 100 acquired by the data exchange section 12 are output to the monitor 2 in a manner facilitating comparison. The operator can readily perform simulation of manufacturing costs of the manufacturing line 100.

The component database 504 can sort and extract the components registered in the component database 504 under predetermined conditions. This also facilitates an examination intended for reducing the number of individual components or the number of element types and curtailing a manufacturing cost of equipment (cells).

A plurality of information items about the manufacturing lines 100 prepared by the manufacturing line information preparation section 9 are stored in the examined line database 510. On the basis of details of information about the manufacturing lines, information about the plurality of manufacturing lines 100 is stored so that it can be extracted and rearranged under arbitrary conditions. Information about the manufacturing lines 100 stored in the examined line database 510 is extracted and rearranged under arbitrary conditions on the basis of details of the information. The information is output to the monitor 2 or the like as a line candidate (which will be described later), whereby the operator can readily and at high speed acquire the manufacturing line 100 satisfying desired requirements.

The manufacturing line information preparation section 9 selectively uses a plurality of element types on the basis of the information about the element types stored in the element type database 503. Thereby, there is prepared the information about the manufacturing line 100 satisfying the requirements entered by means of the keyboard 3 and the mouse 4. The operator can readily acquire, at high speed, a candidate for the manufacturing line 100 satisfying the required specifications for the manufacturing line 100 (i.e., a processing speed, accuracy, costs, or the like), thereby achieving a high degree of convenience.

On the basis of the information about the components constituting the element types stored in the component database 504, the manufacturing line information preparation section 9 computes information about the manufacturing line 100 and at least the number of components required to constitute the manufacturing line 100. Hence, the operator can readily and accurately ascertain the required number of components or the like, thereby achieving a high degree of convenience.

Moreover, the operator can readily ascertain information about the performance of the manufacturing line or manufacturing costs of the same, thereby achieving a high degree of convenience.

The present invention is not limited to the embodiment set forth and is susceptible to various modifications within the scope of the invention.

For instance, in the embodiment, the respective databases constituting the group of databases 50 (i.e., the mechanism database 501, the mechanism element database 502, the element type database 503, the component database 504, the two-dimensional drawing information database 505, the visual information database 506, the manufacturing group database 507, the line database 508, the equipment database 509, the examined line database 510, the line candidate database 511, and the common section database 512) are constituted as external databases which are constructed so as to be able to communicate with the computer main body 13. However, the databases are not limited to these databases. Some or all of the databases maybe stored in a storage device (e.g., a hard disk drive or memory) connected directly to a bus of the computer main body 13.

Moreover, some or all of the databases 501 to 512 constituting the group of databases 50 may be integrated and constituted as a single database. Alternatively, each of the databases 501 to 512 may be divided into a plurality of databases.

Further, items of the databases 501 to 512 are not limited to the embodiment set forth and may be constituted by comprising other items. For instance, in the foregoing embodiment, the element type database 503 is constituted by registering the respective element types (MECHANISM) in association with information comprising items; that is, ELEMENT (designation), CONDITION 1 (computational conditional expression 1), CONDITION 2 (computational conditional expression 2), CONDITION 3 (computational conditional expression 3), DRIVER (the number of motor drivers), IO_PINS (the number of input/output pins), AIR (the number of air pipes), X_ACCURACY (accuracy of iteration in direction X), Y_ACCURACY (accuracy of iteration in direction Y), FORMULA (formula for calculating a processing speed), WORKTIME (processing time), PRICE (manufacturing unit price), PICTURE (visual information), COMMENT (comment for describing element), and UNIT_NUMBER (unit number; a number of set of components). However, the items are not limited to these. For instance, other items; e.g., information about a due date, may be further added to the items. Alternatively, some of the foregoing items may be deleted.

In the foregoing embodiment, the manufacturing line information preparation section 9, the constituent element determination section 10, the appearance information preparation section 11, and the data exchange section 12 are provided in a single computer main body 13. Specifically, the computer main body 13 acts as the manufacturing line information preparation section 9, the constituent element determination section 10, the appearance information preparation section 11, and the data exchange section 12. However, the configuration of the design support system is not limited to this arrangement. Some of the manufacturing line information preparation section 9, the constituent element determination section 10, the appearance information preparation section 11, and the data exchange section 12 may be implemented by another computer system.

By reference to the disclosed embodiment of the present invention, persons who are skilled in the art can practice and manufacture the design support system, design support method and computer-readable recording medium in which design support program is recorded of the invention.

The invention claimed is:

1. A design support system for supporting design of a manufacturing line for an electronic device where the manufacturing line is constituted by combination of a plurality of element types of manufacturing cells, said system comprising:
    an element type database for storing information about said element types beforehand;
    an indication section which indicates to an operator in a selectable manner said element types stored in said element type database;
    a selection section enabling selection of arbitrary element types to be used for constituting said manufacturing line from among said element types indicated by said indication section;
    an element type determination section for determining said element types or specifications of said element types based on said element types selected by said selection section;
    a manufacturing line information preparation section for preparing information about said manufacturing line by acquiring information about said element types stored in said element type database based on said element types selected by said selection section; and
    an output section outputting information about said manufacturing line prepared by said manufacturing line information preparation section,
    wherein said manufacturing line information preparation section prepares information about said manufacturing line based on said element types or said specifications of said element types determined by said element type determination section,
    said element type database stores determination information in association with said element types, and said element type determination section determines said element types or specifications of said element types based on said determination information, and
    said determination information is at least one of a conditional expression which determines another element type, or a specification of another element type, both complying with the selected element type, which would otherwise be caused when a first element type has been selected, and an incidental expression having information to be used for preventing reflection of information about a specific constituent element or element type in response to the selected element type, which would otherwise be caused when a second element type has been selected.

2. The design support system according to claim 1, wherein said element type database stores manufacturing steps (processes and devices) employed in said manufacturing line, in association with element types relevant to said manufacturing steps.

3. The design support system according to claim 2, wherein said element type database hierarchically manages said manufacturing steps.

4. The design support system according to claim 1, further comprising a component database which stores information about components constituting said element types.

5. The design support system according to claim 2, further comprising a component database which stores information about components constituting said element types.

6. The design support system according to claim 3, further comprising a component database which stores information about components constituting said element types.

7. The design support system according to claim 4, wherein said component database performs sorting and extraction of information about said components registered in said component database while taking predetermined conditions as a key.

8. The design support system according to claim 5, wherein said component database performs sorting and extraction of information about said components registered in said component database while taking predetermined conditions as a key.

9. The design support system according to claim 6, wherein said component database performs sorting and extraction of information about said components registered in said component database while taking predetermined conditions as a key.

10. The design support system according to claim 4, further comprising information about an engineering drawing of said components in association with said components, wherein said output section outputs information about an engineering drawing of said components.

11. The design support system according to claim 5, further comprising information about an engineering drawing of said components in association with said components, wherein said output section outputs information about an engineering drawing of said components.

12. The design support system according to claim 6, further comprising information about an engineering drawing of said components in association with said components, wherein said output section outputs information about an engineering drawing of said components.

13. The design support system according to claim 7, further comprising information about an engineering drawing of said components in association with said components, wherein said output section outputs information about an engineering drawing of said components.

14. The design support system according to claim 8, further comprising information about an engineering drawing of said components in association with said components, wherein said output section outputs information about an engineering drawing of said components.

15. The design support system according to claim 9, further comprising information about an engineering drawing of said components in association with said components, wherein said output section outputs information about an engineering drawing of said components.

16. The design support system according to claim 1, further comprising:
    information about the appearance of said element types; and
    an appearance information preparation section for preparing information about the appearance of said manufacturing line on the basis of information about the appearance of said element types, wherein said output section outputs information about the appearance of said manufacturing line prepared by said appearance information preparation section.

17. The design support system according to claim 1, further comprising:
a manufacturing line information storage section which can store a plurality of pieces of information about said manufacturing line prepared by said manufacturing line information preparation section and which can extract and arrange said plurality of pieces of information about said manufacturing line under arbitrary conditions on the basis of details of said information about said manufacturing line; and
a line candidate indication section for indicating said extracted and arranged information about said manufacturing line as a candidate for said manufacturing line.

18. The design support system according to claim 1, further comprising:
a condition input section which enables input of conditions pertaining to preparation of information about said manufacturing line to be prepared by said manufacturing line information preparation section, wherein said manufacturing line information preparation section selectively uses said plurality of element types on the basis of information about said element types stored in said element type database, thereby preparing information about said manufacturing line satisfying said conditions input by said condition input section.

19. The design support system according to claim 1, further comprising:
a data exchange section capable of exchanging data with an external information processing system.

20. The design support system according to claim 19, wherein
said external information processing system is a system for managing manufacturing costs of said manufacturing line;
said data exchange section acquires from said external information processing system information about manufacturing costs of said manufacturing line; and
said output section outputs said information about said manufacturing line prepared by said manufacturing line information preparation section and said information about manufacturing costs of said manufacturing line acquired by said data exchange section in such a manner that said pieces of information can be compared with each other.

21. The design support system according to claim 19, wherein said external information processing system is a purchasing system, and said data exchange section transfers, to said purchasing system, said information about said manufacturing line prepared by said manufacturing line information preparation section.

22. The design support system according to claim 20, wherein said external information processing system is a purchasing system, and said data exchange section transfers, to said purchasing system, said information about said manufacturing line prepared by said manufacturing line information preparation section.

23. The design support system according to claim 4 wherein said manufacturing line information preparation section computes at least the number of components required to constitute said manufacturing line as information about said manufacturing line on the basis of said information about components constituting said element types stored in said component database.

24. The design support system according to claim 23, further comprising:
a data exchange section exchanging data with an external information processing system, wherein said data exchange section transfers at least the number of components required to constitute said manufacturing line to said external information processing system.

25. The design support system according to claim 1, wherein information pertaining to said element types stored in said element type database comprises at least any of a manufacturing unit price, a delivery time, accuracy, a processing time, visual information, and comment, all pertaining to said element types.

26. The design support system according to claim 1, wherein information about said manufacturing line is information pertaining to performance or a manufacturing cost of said manufacturing line.

27. A design support method for supporting design of a manufacturing line for an electronic device where the manufacturing line is constituted by combination of a plurality of element types of manufacturing cells, said method comprising:
(a) indicating to an operator in a selectable manner said element types stored in an element type database storing information about said element types beforehand;
(b) selecting arbitrary element types to be used for constituting said manufacturing line from among said element types indicated;
(c) determining said element types or specifications of said element types based on said element types selected;
(d) preparing information about said manufacturing line by acquiring information about said element types stored in said element type database based on said element types selected; and
(e) outputting the prepared information about said manufacturing line,
wherein preparation of the information about said manufacturing line is based on said element types or said specifications of said element types determined,
said element type database stores determination information in association with said element types, and the determining of said element types or specifications of said element types is based on said determination information, and
said determination information is at least one of a conditional expression which determines another element type, or a specification of another element type, both complying with the selected element type, which would otherwise be caused when a first element type has been selected, and an incidental expression having information to be used for preventing reflection of information about a specific constituent element or element type in response to the selected element type, which would otherwise be caused when a second element type has been selected.

28. A computer-readable recording medium which stores a design support program for supporting design of a manufacturing line for an electronic device where the manufacturing line is constituted by combination of a plurality of element types of manufacturing cells, said program instructing a computer to perform operations comprising:
(a) indicating to an operator in a selectable manner said element types stored in an element type database storing information about said element types beforehand;

(b) selecting arbitrary element types to be used for constituting said manufacturing line from among said element types indicated;
(c) determining said element types or specifications of said element types based on said element types selected;
(d) preparing information about said manufacturing line by acquiring information about said element types stored in said element type database based on said element types selected and
(e) outputting the prepared information about said manufacturing line,
wherein preparation of the information about said manufacturing line is based on said element types or said specifications of said element types determined,
said element type database stores determination information in association with said element types, and determining of said element types or specifications of said element types is based on said determination information, and said determination information is at least one of a conditional expression which determines another element type, or a specification of another element type, both complying with the selected element type, which would otherwise be caused when a first element type has been selected, and an incidental expression having information to be used for preventing reflection of information about a specific constituent element or element type in response to the selected element type, which would otherwise be caused when a second element type has been selected.

* * * * *

UNITED STATES PATENT AND TRADEMARK OFFICE
CERTIFICATE OF CORRECTION

PATENT NO. : 7,133,733 B2
APPLICATION NO. : 10/806105
DATED : November 7, 2006
INVENTOR(S) : Toru Okada et al.

It is certified that error appears in the above-identified patent and that said Letters Patent is hereby corrected as shown below:

Column 25, Line 61, after "claim 4" insert --,--.

Column 27, Line 10, after "selected" insert --;--.

Signed and Sealed this

Sixth Day of March, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,133,733 B2 | Page 1 of 1 |
| APPLICATION NO. | : 10/806105 | |
| DATED | : November 7, 2006 | |
| INVENTOR(S) | : Toru Okada et al. | |

It is certified that error appears in the above-identified patent and that said Letters Patent is hereby corrected as shown below:

Column 25, Line 61, after "claim 4" insert --,--.

Column 27, Line 10, after "selected" insert --;--.

Signed and Sealed this

Twentieth Day of March, 2007

JON W. DUDAS
*Director of the United States Patent and Trademark Office*